G. C. LONG.
HARROW.
APPLICATION FILED MAY 8, 1912.
1,052,931.
Patented Feb. 11, 1913.
2 SHEETS—SHEET 1.
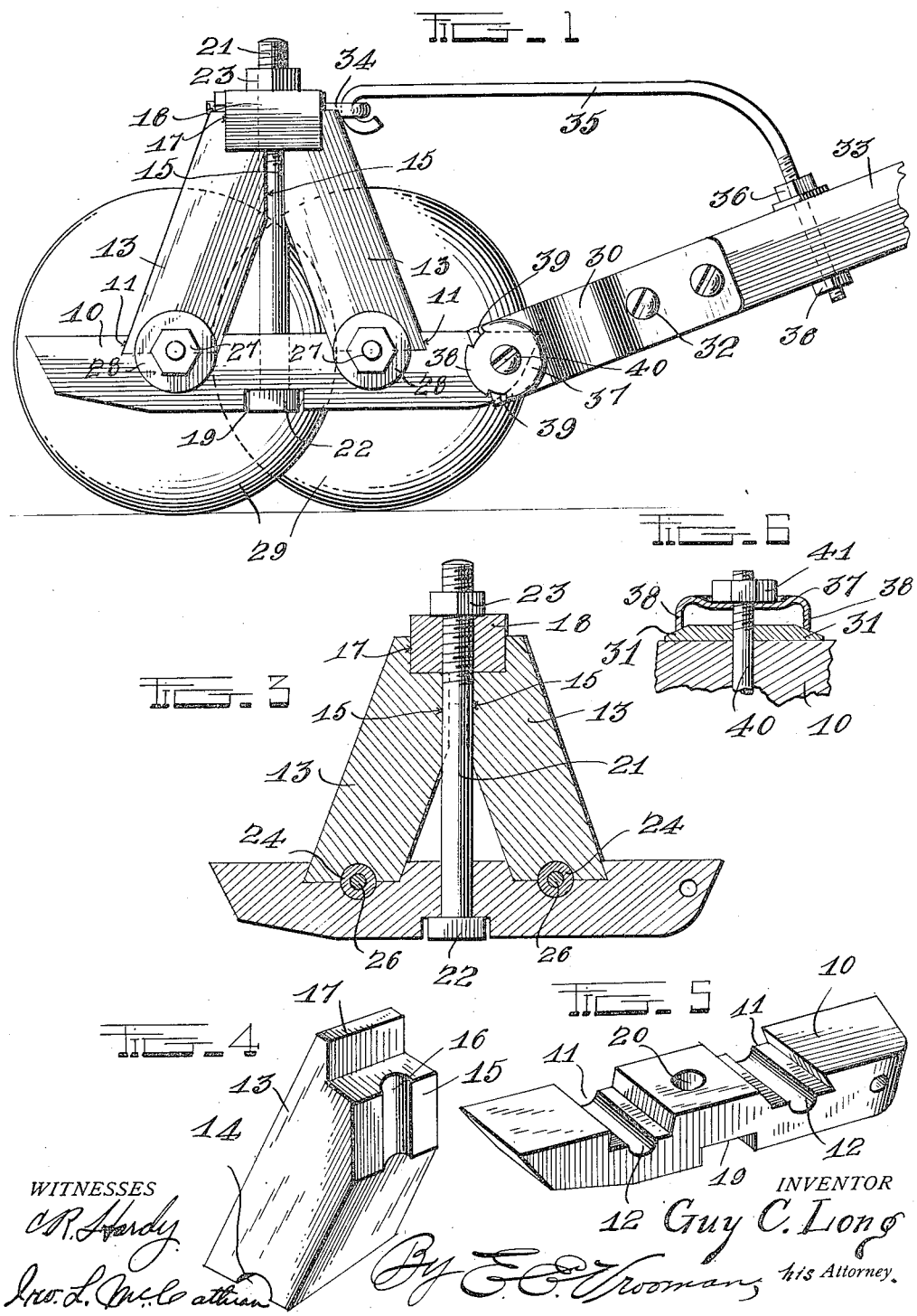
INVENTOR
Guy C. Long
By E. E. Vrooman, his Attorney.
WITNESSES
C. R. Hardy
Jno. L. McCathran

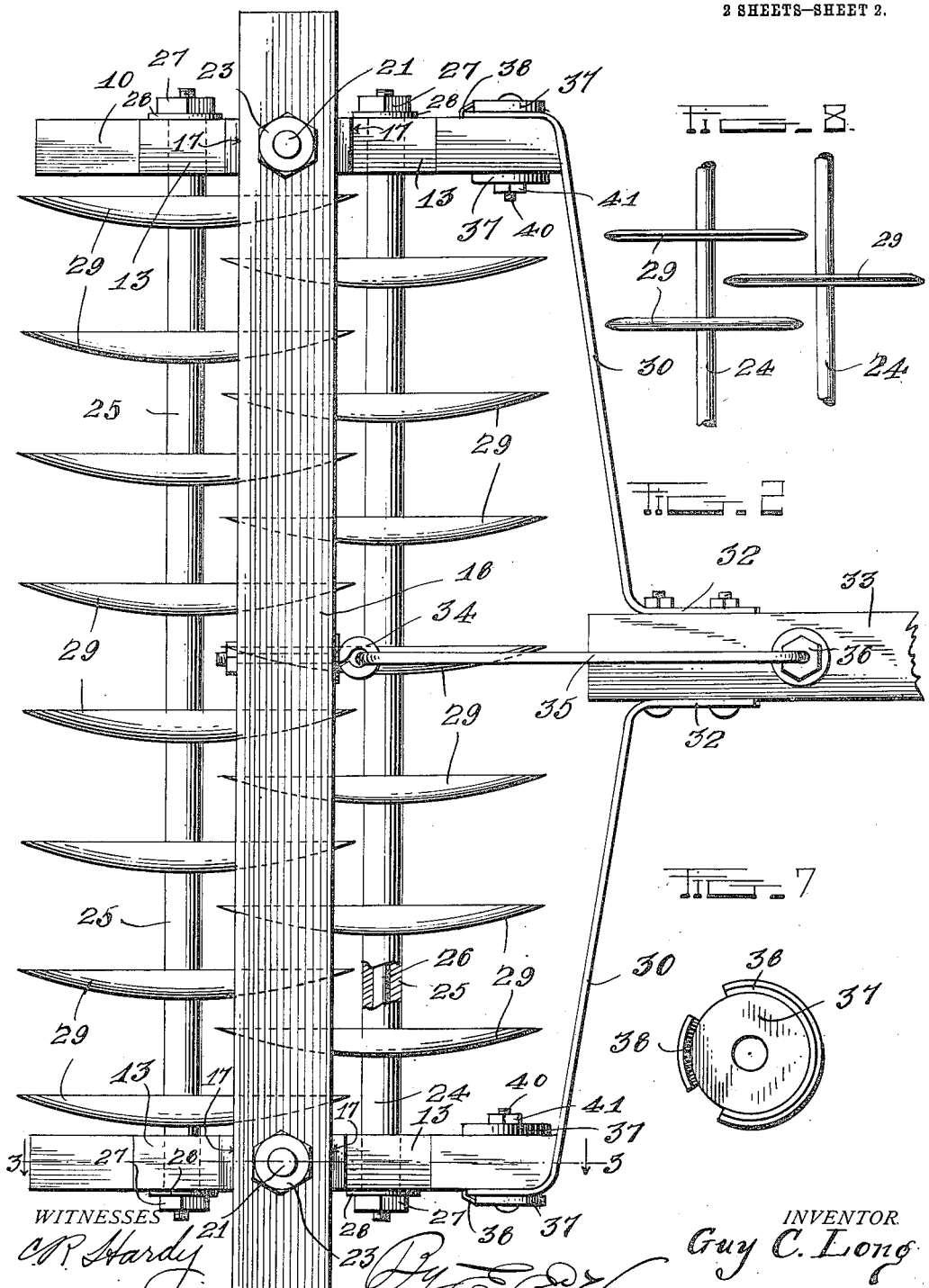

UNITED STATES PATENT OFFICE.

GUY C. LONG, OF NAVAN, SOUTH DAKOTA.

HARROW.

1,052,931.   Specification of Letters Patent.   Patented Feb. 11, 1913.

Application filed May 8, 1912. Serial No. 696,015.

*To all whom it may concern:*

Be it known that I, GUY C. LONG, a citizen of the United States, residing at Navan, in the county of Corson and State of South Dakota, have invented certain new and useful Improvements in Harrows, of which the following is a specification, reference being had therein to the accompanying drawing.
This invention relates to agricultural implements and has special reference to an improved form of rotary disk harrow especially adapted for packing and pulverizing the ground.
One object of the invention is to improve and simplify the general construction of devices of this character.

Another object of the invention is to provide a novel and efficient frame for devices of this character.

With the above and other objects in view, the invention consists in general of certain novel constructions, combinations and arrangements of parts, as will be hereinafter fully described, illustrated in the accompanying drawings, and specifically claimed.

In the accompanying drawings like characters of reference indicate like parts in the several views, and Figure 1 is a side elevation of a harrow constructed in accordance with this invention. Fig. 2 is a top plan view thereof. Fig. 3 is a section on the line 3—3, Fig. 2. Fig. 4 is a detail perspective of one of the combined frame members and bearing caps. Fig. 5 is a detail perspective of one of the frame members and bearings. Fig. 6 is an enlarged transverse section through one of the nut locking disks. Fig. 7 is an inner face view of such a disk.
Fig. 8 is a detail view showing the use of harrow disks with rounded edges.

In the present embodiment of the invention there is provided on each side a frame member 10 on the upper side of which are suitable notches or slots 11 having inclined sides, as can clearly be seen by reference to Fig. 3. The bottom of each of these notches 11 is provided with a groove 12 substantially semi-circular in form and constituting journal bearings. Extending upward from each of the frame members 10 is a pair of struts 13, each having a groove 14 extending transversely across its foot so that when the struts are in position in the slots 11 the grooves 14 will register with the grooves 12, thus making a complete bearing.

Each of the members 14 is provided with a vertical face 15 wherethrough extends a vertically disposed groove 16 and these members furthermore have reduced portions 17 so arranged that when in position these reduced portions provide for the seating of an upper transverse frame member 18 which extends from side to side of the machine.

Each of the frame members 10 is provided on its underside with a transverse slot 19 and from this slot an opening 20 runs through the respective frame member in a vertical direction.

The frame members just described are all held in position by means of vertically disposed bolts 21 which pass through the respective openings 20 and have their heads 22 lying in the slots or grooves 19. The shanks of these bolts pass between the upper ends of the members 13, lying in the respective grooves 16 and the upper ends of the bolts extend through opposite ends of the cross member 18 and are provided with suitable nuts 23 so that all of the frame members are held firmly together.

Carried in the journal bearings formed by the grooves 12 and 14 are tubular members 24 which serve in connection with other tubular members 25 to constitute spacers, the last-mentioned members being carried on a rod 26 which also runs through the members 24 and is provided with the usual nuts 27 and washers 28. On the rods 26 between the spacers are provided plow colters 29, the colters 29 of one rod 26 being in staggered relation to the colters on the other rod, and all being of the disk type. Extending inwardly from the forward ends of the members 10 are brace bars 30 having beveled ends 31. The inner ends of these brace members are bent to run parallel as at 32 and between these inner ends is received a draft pole or beam 33. In order to brace the pole 33 to the upper member 13 an eye bolt 34 extends through said upper member 18 and extending forwardly with its forward end curved downward is a brace bar 35, the lower end whereof extends through the pole 33, being provided on each side in suitable adjusting nuts 36. By means of this construction a certain amount of spring effect is given the pole.

The members 30 are preferably held in position on the forward ends of the members 10 by a novel form of nut lock which consists in a plate 37 of resilient metal. On this plate is provided a downwardly bent flange 38 having suitable notches 39 arranged at right angles to each other.

Bolts 40 pass through the locking washers, members 30, and members 10, being provided on one end with suitable nuts 41 and it is to be noted that the bolt heads and nuts are of relatively small size with respect to the diameter of the locking washer. When this washer is in position the notches 39 receive the corners of the beveled ends of the members 30, as clearly shown in Fig. 1. The washer is thus prevented from turning or tightening the nut 41, the center of the washer being caused to spring inward, thus making a safe and secure lock.

In the operation of the device it will be noted that the front colters cut the ground up in clods while the rear colters traversing over the ground pulverize any clods that may pass between the front colters, it being, of course, obvious that any clods that pass the front colters are also pulverized by them.

There has thus been provided a simple and efficient device of the kind described, and for the purpose specified.

It will be obvious that minor changes may be made in the construction of the apparatus, as for instance, either the concave disks shown in Fig. 2 or the flat disks shown in Fig. 8 may be used without departing from the spirit of the invention.

Having thus described the invention, what is claimed as new, is:—

1. In a harrow of the class described, a frame including a pair of side members having notches extending transversely thereof provided with journal bearings formed in their bottoms, strut members held in said notches with their upper ends inclined toward each other, said strut members being provided at their bottom ends with notches registering with the journal bearings and constituting bearing caps, said strut members having opposed vertically disposed faces provided each with a vertical groove, reduced portions formed on the upper ends of said members to provide seats at said upper ends, a transverse member extending across the harrow and having its ends resting in said seats, and a bolt at each end of said transverse member extending upwardly through the bottom member and through the transverse member, the shank of said bolt being engaged in the vertical grooves whereby said bolts lock all of said parts in position.

2. In a harrow of the class described, a frame including a pair of side members having notches extending transversely thereof provided with journal bearings formed in their bottoms, struts held in said notches with their upper ends inclined toward each other, said strut members being provided at their bottoms with notches registering with the journal bearings and constituting bearing caps, said strut members having opposed vertically disposed faces provided each with a vertical groove, reduced portions formed on the upper ends of said members to provide seats at said upper ends, a transverse member extending across the harrow and having its ends resting in said seats, a bolt at each end of said transverse member extending upwardly through the bottom member and through the transverse member, the shank of said bolt being engaged in the vertical grooves whereby said bolts lock all of said parts in position, shafts carried in said journal bearings, spacers on said shafts, disk colters on said shafts between said spacers, the colters on one shaft being in staggered relation to the colters on the other shaft, and draft means carried by said frame members.

3. In a harrow of the class described, a frame including a pair of side members having notches extending transversely thereof provided with journal bearings formed in their bottoms, strut members held in said notches with their upper ends inclined toward each other, said strut members being provided at their bottom ends with notches registering with the journal bearings and constituting bearing caps, said strut members having opposed vertically disposed faces provided each with a vertical groove, reduced portions formed on the upper ends of said members to provide seats at said upper ends, a transverse member extending across the harrow and having its ends resting in said seats, a bolt at each end of said transverse member extending upwardly through the bottom member and through the transverse member, the shank of said bolt being engaged in the vertical grooves whereby said bolts lock all of said parts in position, shafts carried in said journal bearings, spacers on said shafts, disk colters on said shafts between said spacers, the colters on one shaft being in staggered relation to the colters on the other shaft, draft means carried by said frame members, and a resilient brace for said draft means.

In testimony whereof I hereunto affix my signature in presence of two witnesses.

GUY C. LONG.

Witnesses:
G. E. BRECKENRIDGE,
H. C. LIMERICK.